Patented Jan. 14, 1941

2,228,459

UNITED STATES PATENT OFFICE 2,228,459

ARYLIDE COMPOSITION

Andrew Jones, Jr., Buffalo, N. Y., assignor to National Aniline & Chemical Company, Inc., New York, N. Y., a corporation of New York No Drawing. Application July 11, 1938, Serial No. 218,629

17 Claims. (Cl. 8—46)

This invention relates to compositions for use in the production of azo dyes by processes wherein a diazo component is coupled with a carboxylic acid arylide which is free from groups inducing solubility in water. It relates more particularly to improved compositions comprising such arylides, and especially arylides of 2,3-hydroxynaphthoic acid.

One method of making azo dyes involves coupling a diazo component with a coupling component which is a carboxylic acid arylide and is free from acid groups inducing solubility in water: for example, an arylide of 2,3-hydroxy-naphthoic acid; an arylide of acetoacetic or other acylaceto carboxylic acid; an arylide of a 2,3-hydroxy-carboxylic acid derivative of anthracene, anthraquinone, carbazol, etc.

The said arylides usually come into the market in the form of the free hydroxy compounds or equivalent as distinguished from the salts thereof (e. g., the free arylide of 2,3-naphthoic acid, or the free arylide of acetoacetic acid), generally in the form of a dry solid, but they are used in alkaline solution for coupling with the diazo component. The said arylides are insoluble in water and notoriously difficult to wet or disperse in aqueous solutions; and owing to these properties it is difficult to prepare from them usable aqueous solutions of their alkali-metal salts. Heretofore, to overcome these difficulties, it has been proposed to mix the arylide with gums or soaps to form dry compositions which, when added to an aqueous medium, disintegrate to release the arylide in close contact with an aqueous solution of the gum or soap formed in situ, and thereby to cause dispersion of the arylide through the aqueous mass to which caustic alkali is added before or after entry in the said mass of the arylide. Another proposed method consists of making a smooth paste of the arylide with a water-soluble organic solvent (such as alcohol or acetone) or with a sulfonated oil (such as Turkey red oil or monopole brilliant oil), and adding the resulting paste to the aqueous alkali. In most instances further additions of Turkey red oil are found necessary to assist in dispersing and helping the arylide and helping it to dissolve in the aqueous alkali to a sufficient extent to be usable for dyeing and printing purposes. Such treatments lead, however, to unsatisfactory results; thus, the presence of foaming agents, such as gums and soaps, in amount to effect dispersion of the arylides causes the solutions and dispersions thereof to foam and thereby become unfit for use in dyeing and printing processes. The use of Turkey red oil leads to difficulties with insoluble calcium and magnesium salts of the oil, which form in hard water, and to objectionable sticky viscous mixtures which are messy and troublesome to handle. The use of water-soluble organic solvents is costly and frequently involves inconveniences such as firehazards. Further, the presence in the resulting solutions or dispersions of such substances as gums, soaps and Turkey red oil in large amounts in relation to the arylide tends to diminish the substantive qualities of the arylides.

An object of the present invention is to provide arylides of the above type in the form of compositions which wet out readily and disperse rapidly in cold and warm water to form aqueous pastes which dissolve readily upon addition of caustic alkali.

Another object of the invention is to provide arylides of the above type in the form of compositions which dissolve readily in water upon addition of caustic alkali.

A further object of the invention is to provide arylides of 2,3-hydroxy-naphthoic acid in the form of compositions which wet out readily and disperse rapidly when added to water, and which readily dissolve upon addition of caustic alkali.

Other objects of the invention in part will be obvious and in part will appear hereinafter.

According to the present invention, arylide compositions of improved properties are produced by incorporating with arylides of the above type a small amount of a wetting and dispersing composition comprising a mixture of an alkyl aromatic sulfonate which is characterized by having high wetting power and little or no foaming power with a lesser amount of a water-insoluble organic hydroxide (phenol or alcohol).

The compositions of the present invention can be prepared by any suitable procedure adapted to form an intimate mixture of the components. Thus, an arylide of the above type, in the free form and in the form of a solid, may be incorporated with the other components in solid form, as by grinding them together. They may also be prepared as dry compositions by stirring or grinding the components together in the presence of water, alcohol, or other inert easily vaporized liquid, to form a uniform paste, and then evaporating the water or other liquid.

The amount of wetting and dispersing composition employed in relation to the amount of the arylide may vary. It is a feature of the present invention, however, that only a small amount of the wetting and dispersing composition is required to produce highly satisfactory products. Thus, amounts not exceeding 10 per cent of the weight of the total composition in dry form are ordinarily employed; and, in general, amounts from 3 to 5 per cent of the weight of the total composition in dry form are employed. The use of such small amounts of additional materials has the advantage that while the said amounts are sufficient to cause the arylides to wet quickly and to form satisfactory suspensions which dissolve with great rapidity in the presence of caustic alkali in the aqueous medium, they make unnecessary the addition of other solvents and assistants for solubilizing the arylides and yet they are insufficient to affect adversely the substantive properties of the arylides or their coupling powers with diazo components.

A preferred wetting and dispersing composition employed in accordance with the present invention consists of the following ingredients in the following proportions by weight:

Di-isopropyl naphthalene sodium sulfonate_ 90
p-Tertiary amyl phenol_____ 10

For convenience this composition is referred to herein as "disperser N." The invention is not limited, however, to these specific amounts of di-isopropyl naphthalene sodium sulfonate, and p-tertiary amyl phenol; and other amounts may be used, provided the amount of di-isopropyl naphthalene sodium sulfonate is greater than that of p-tertiary amyl phenol. Preferably it is at least three times the amount of p-tertiary amyl phenol.

The compositions of the present invention are distinguished by a number of advantageous characteristics. Thus, they can be stored for long periods of time with no deterioration, since they contain no free alkali. They are solids and therefore can be dispensed with exactitude. They wet out readily and disperse almost immediately upon making contact with water, and the resulting aqueous pastes react quickly with aqueous caustic alkali to form stable, highly concentrated solutions of the arylides. They react so rapidly with caustic alkalis that it is not necessary to use large excesses of caustic alkali to bring the arylides into aqueous solution in the form of the alkali-metal salts; it is sufficient if from 2 to about 4 times the amount of caustic soda or potash theoretically required for the conversion of the arylides to the sodium or potassium salts is added to the paste, a clear aqueous solution being formed very quickly upon addition of water.

The invention is illustrated by the following specific examples in which the parts are by weight:

Example 1.—95 parts of Naphthol AS (the anilide of 2,3-hydroxy-naphthoic acid), in the form of the free compound, and 5 parts of disperser N, above described, are thoroughly mixed in the dry form by grinding in a ball mill or other suitable mixing apparatus. Preferably the mixture is ground to a sufficient extent to pass through screens having openings of at least 60 mesh. A powder is thus obtained which, when added to cold or warm water, disperses readily to form a uniform paste or suspension. The resulting powder is therefore admirably suited for preparing solutions of Naphthol AS in concentrated or dilute form.

Thus, when 3 parts of said powder are stirred into 45 parts of cold water, a uniform moist paste of the Naphthol AS is immediately formed. When 5.7 parts of a 24 per cent (by weight) aqueous caustic soda solution are added to the resulting paste and the mixture is diluted with hot water (at about 90° F. to about 120° F.) in sufficient amount to bring the total weight of the mixture to 500 parts, a clear solution of the Naphthol AS sodium salt is obtained. If desired, formaldehyde and/or common salt may be added to the resulting solution for the purpose of stabilizing the solution, as is customary in the art. The resulting solution can be used in the usual manner for impregnating textile materials, such as cotton skeins or piece goods, rayon and other fibers and fabrics, which, when employed in the making of dyed materials by subsequent dyeing or printing with azo components in the known manner yield excellent dyeings and prints.

Example 2.—95 parts of Naphthol AS, in the form of the free compound, and 5 parts of a mixture consisting of di-isopropyl naphthalene sodium sulfonate and capryl alcohol in the ratio of 9:1 parts by weight, are thoroughly mixed in the dry form as described in Example 1. The resulting powder is similar to that of Example 1, although when added to water it disperses a little less readily than the powder of Example 1.

It will be realized by those skilled in the art that the invention is not limited to the above specific examples. Thus, in place of Naphthol AS employed in the examples, an equal quantity of any of the other arylides of 2,3-hydroxy-naphthoic acid, or mixtures of two or more thereof, can be used. Further, arylides of acetoacetic and other acylacetic acids, and arylides of other aromatic 2,3-hydroxy-carboxylic acids, such as those derived from anthracene, anthraquinone, carbazol, and the like, may be similarly employed. Since the arylides of this type are well known to those skilled in the art, only a few are mentioned for the purposes of illustration; namely:

2,3-hydroxy-naphthoic acid 2'-toluidide
2,3-hydroxy-naphthoic acid 5'-chlor-2'-toluidide
2,3-hydroxy-naphthoic acid 3'-nitro-anilide
2,3-hydroxy-naphthoic acid 4'-nitro-anilide
2,3-hydroxy-naphthoic acid 4'-chloranilide
2,3-hydroxy-naphthoic acid 2'-anisidide
2,3-hydroxy-naphthoic acid 2'-phenetidide
2,3-hydroxy-naphthoic acid 4'-anisidide
2,3-hydroxy-naphthoic acid 2'-methyl-4'-methoxy-anilide
2,3-hydroxy-naphthoic acid 5'-chlor-2',4'-dimethoxy-anilide
2,3-hydroxy-naphthoic acid 2',5'-dimethoxy-anilide
2,3-hydroxy-naphthoic acid 1'-naphthylide
2,3-hydroxy-naphthoic acid 2'-naphthylide
2,3-hydroxy-naphthoic acid dianisidide
Carbazol-2-hydroxy-3-carboxy-2'-toluidide While the preferred wetting and dispersing compositions employed in conjunction with the arylide are those of the type represented by the above disperser N, other wetting and dispersing compositions of a related nature may be employed. Thus, instead of di-isopropyl naphthalene sodium sulfonates, other alkyl aromatic sulfonates of the benzene and naphthalene series may be employed which are characterized by high wetting power and little or no foaming power, and which contain a minimum of 9 and a maximum of 16 carbon atoms of which at least 3 are in an alkyl group which is a nuclear substituent, in the form of their alkali-metal and ammonium salts; for example, monopropyl naphthalene sodium sulfonate, mono- and dibutyl benzene sodium sulfonates, mono- and diamyl benzene sodium sulfonate, and hexyl benzene sodium sulfonate. Further, instead of p-tertiary amyl phenol and capryl alcohol other substantially water-insoluble phenols and alcohols may be employed; for example, any water-insoluble alkyl phenol containing a maximum of 16 carbon atoms (e. g., isopropyl phenol, decyl phenol, pine tar phenols, etc.), any water-insoluble alcohol containing a maximum of 8 carbon atoms, or any mixture of two or more thereof.

Since changes may be made in the above compositions which embody the invention without departing from its scope, it is intended that all matter contained in the above description shall be interpreted as illustrative and not in a limiting sense, except as limited by the appended patent claims.

I claim:

1. A composition in the solid form for use in producing azo dyes, comprising a carboxylic acid arylide coupling component free from acid groups inducing solubility in water and, as a wetting and dispersing agent for said arylide coupling component, a mixture of an alkyl aromatic sulfonate of high wetting power and little foaming power in admixture with a water-insoluble organic hydroxide, the amount of the latter mixture being small relative to the amount of arylide coupling component by weight.

2. A composition in the solid form for use in producing azo dyes, comprising a carboxylic acid arylide coupling component free from acid groups inducing solubility in water and, as a wetting and dispersing agent for said arylide coupling component, a small amount of a mixture of a major amount of an alkyl aromatic sulfonate of high wetting and little foaming power which contains a minimum of 9 and a maximum of 16 carbon atoms of which at least 3 are in an alkyl group which is a nuclear substituent, and a minor amount of a water-insoluble organic hydroxide selected from the group consisting of alkyl phenols containing a maximum of 16 carbon atoms and alcohols containing a maximum of 8 carbon atoms.

3. A composition in the solid form for use in producing azo dyes, comprising a carboxylic acid arylide coupling component free from acid groups inducing solubility in water and, as a wetting and dispersing agent for said arylide coupling component, a small amount of a mixture of a major amount of an alkyl naphthalene sulfonate of high wetting and little foaming power which contains a minimum of 13 and a maximum of 16 carbon atoms of which at least 3 are in an alkyl group which is a nuclear substituent, and a minor amount of an alkyl phenol containing a maximum of 16 carbon atoms.

4. A composition in the dry solid form for use in producing azo dyes, comprising a carboxylic acid arylide coupling component free from acid groups inducing solubility in water and, as a wetting and dispersing agent for said arylide coupling component, a small amount of a mixture of an alkyl aromatic sulfonate of the benzene and naphthalene series of high wetting and little foaming power which contains a minimum of 9 and a maximum of 16 carbon atoms of which at least 3 are in an alkyl group which is a nuclear substituent, and p-tertiary-amyl phenol.

5. An arylide composition in the dry solid form for use in producing azo dyes, comprising an aromatic carboxylic acid arylide coupling component free from acid groups inducing solubility in water and, as a wetting and dispersing agent for said arylide coupling component, a small amount of a mixture of isopropyl naphthalene sodium sulfonate and a tertiary-amyl phenol.

6. A 2,3-hydroxy-naphthoic acid arylide composition in the solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of an alkyl aromatic sulfonate of high wetting power and little foaming power in admixture with a lesser amount of a water-insoluble organic hydroxide.

7. A 2,3-hydroxy-naphthoic acid arylide composition in the solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of an alkyl aromatic sulfonate of high wetting power and little foaming power in admixture with a lesser amount of a water-insoluble organic hydroxide selected from the group consisting of alkyl phenols containing a maximum of 16 carbon atoms and alcohols containing a maximum of 8 carbon atoms.

8. A 2,3-hydroxy-naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture comprising a major amount of an alkyl aromatic sulfonate of high wetting and little forming power which contains a minimum of 9 and a maximum of 16 carbon atoms of which at least 3 are in an alkyl group which is a nuclear substituent, and a minor amount of a water-insoluble organic hydroxide selected from the group consisting of alkyl phenols containing a maximum of 16 carbon atoms and alcohols containing a maximum of 8 carbon atoms.

9. A 2,3-hydroxy-naphthoic acid arylide composition in the dry solid form adapted to wet out and disperse rapidly when treated with water, comprising at least 90 per cent by weight of an arylide of 2,3-hydroxy-naphthoic acid free from acid groups inducing solubility in water and, as a wetting and dispersing agent for said arylide, at most 10 per cent by weight of a mixture of an alkyl aromatic sulfonate of the benzene and naphthalene series of high wetting and little foaming power which contains a minimum of 9 and a maximum of 16 carbon atoms of which at least 3 are in an alkyl group which is a nuclear substituent, and a water-insoluble organic hydroxide selected from the group consisting of alkyl phenols containing a maximum of 16 carbon atoms and alcohols containing a maximum of 8 carbon atoms, the amount of alkyl aromatic sulfonate being at least 3 times the amount of organic hydroxide.

10. A 2,3-hydroxy-naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of an alkyl aromatic sulfonate selected from the group consisting of di-isopropyl naphthalene sodium sulfonate, monopropyl naphthalene sodium sulfonate, mono- and di-butyl benzene sodium sulfonates, mono- and diamyl benzene sodium sulfonates, and hexyl benzene sodium sulfonate, and a water-insoluble organic hydroxide selected from the group consisting of alkyl phenols containing a maximum of 16 carbon atoms and alcohols containing a maximum of 8 carbon atoms.

11. A 2,3-hydroxy-naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of isopropyl naphthalene sodium sulfonate and a water-insoluble alkyl phenol containing a maximum of 16 carbon atoms.

12. A 2,3-hydroxy-naphthoic acid arylide composition in the dry solid form adapted to wet out and disperse rapidly when treated wtih water, comprising an arylide of 2,3-hydroxy-naphthoic acid free from acid groups inducing solubility in water and, as a wetting and dispersing agent for said arylide, a small amount of a mixture of isopropyl naphthalene sodium sulfonate and a water-insoluble alcohol containing a maximum of 8 carbon atoms.

13. A 2,3-hydroxy naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of di-isopropyl naphthalene sodium sulfonate and a water-insoluble alkyl phenol containing a maximum of 16 carbon atoms, the amount of the latter component being a fraction of the amount of the di-isopropyl naphthalene sodium sulfonate.

14. A 2,3-hydroxy-naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of di-isopropyl naphthalene sodium sulfonate and a lesser amount of an amyl phenol.

15. A 2,3-hydroxy-naphthoic acid arylide composition in the dry solid form adapted to wet out and disperse rapidly when treated with water, comprising an arylide of 2,3-hydroxy-naphthoic acid free from acid groups inducing solubility in water and, as a wetting and dispersing agent for said arylide, a small amount of a mixture of di-isopropyl naphthalene sodium sulfonate, and p-tertiary amyl phenol, the amount of the di-isopropyl naphthalene sodium sulfonate being at least 3 times the amount of the amyl phenol.

16. A composition in the dry solid form for use in producing azo dyes, comprising an admixture of an arylide of 2,3-hydroxynaphthoic acid free from acid groups inducing solubility in water and, as a wetting and dispersing agent for said arylide, a mixture of di-isopropyl naphthalene sodium sulfonate with not more than one-third of its weight of an amyl phenol, said mixture of di-isopropyl sodium sulfonate and amyl phenol constituting at most 10 per cent by weight of said admixture.

17. A composition in the dry solid form for use in producing azo dyes, comprising an admixture of an arylide of 2,3-hydroxynaphthoic acid free from acid groups inducing solubility in water and, as a wetting and dispersing agent for said arylide, a mixture of di-isopropyl naphthalene sodium sulfonate with not more than one-third of its weight of p-tertiary amyl phenol, said mixture of di-isopropyl naphthalene sodium sulfonate and p-tertiary amyl phenol constituting at most 5 per cent by weight of said admixture.

ANDREW JONES, Jr.